Jan. 16, 1940. J. D. LANGDON Re. 21,323

FLUSH VALVE UNIT

Original Filed Sept. 22, 1931

INVENTOR

BY J. D. Langdon

ATTORNEY

Reissued Jan. 16, 1940

Re. 21,323

UNITED STATES PATENT OFFICE 21,323

FLUSH VALVE UNIT

Jesse D. Langdon, Los Angeles, Calif.

Original No. 2,074,698, dated March 23, 1937, Serial No. 564,340, September 22, 1931. Application for reissue March 9, 1939, Serial No. 260,815

15 Claims. (Cl. 137—93)

The present invention relates to valves and aims to provide novel and improved measuring valves for water, or other fluid, which may be used for permitting either a manually determined or predetermined flow of fluid, or which may be used for a flush valve for toilets.

The other objects of my invention are,

First, to provide direct mechanical flush valve opening means combined with pressure opening means.

Second, to provide pressure closure means combined with direct manual and mechanical closure means, for a valve mechanism.

Third, to provide self cleaning and positive valve seats.

Fourth, to provide a tapered off and slow closure to cause the toilet bowl to refill where used for a flush valve.

Fifth, to provide several means to control the timing and amount of fluid passing through the flush valve during automatic closing operation.

Sixth, to provide a flush valve which is non-syphonic, acting as a check valve when closed.

Seventh, to provide a flush valve which is non-syphonic when held open for operation.

Eighth, to provide an air inlet around the flush valve outlet and prevent water from being forced out through the air inlet so provided.

Ninth, to provide a non-syphonic unit conveniently built in, or adapted to be attached to a flush valve outlet.

Other and further objects will appear as the descriptive matter proceeds, as illustrated by the drawing which, it is understood, is used for the purpose of illustration only, and the mechanical structure of my invention may be changed according to the exigencies of its use within the scope of what is claimed.

Figure 1:
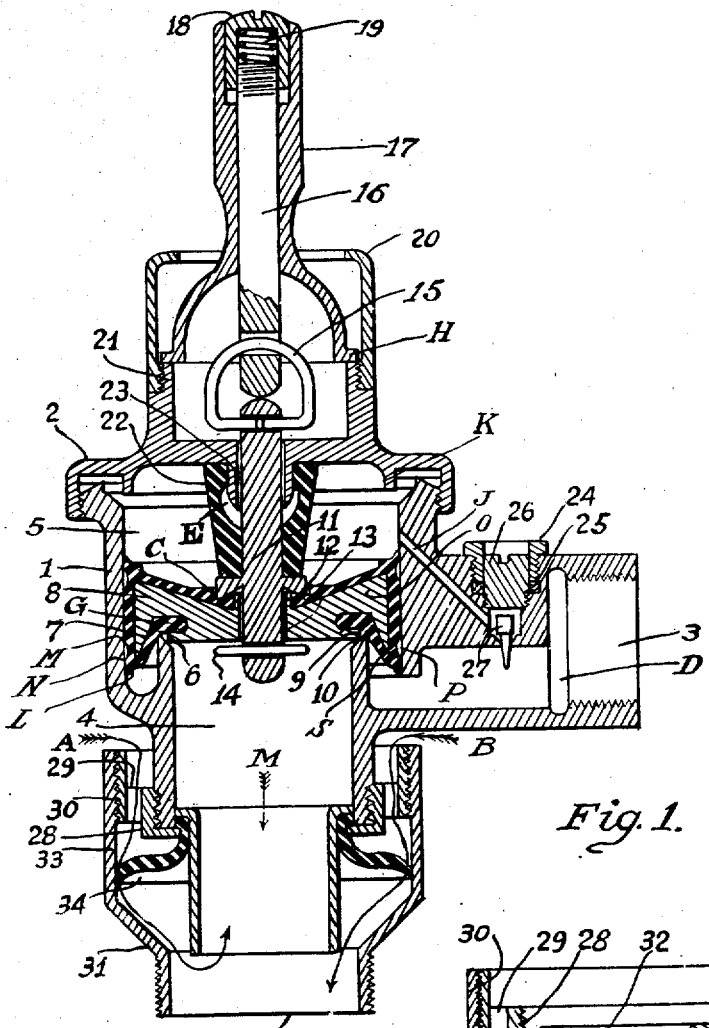
Fig. 1 is a cross-sectional view showing the entire flush valve assembly.

Like numerals indicate like parts in all the figures of the drawing. The parts comprising the valve are valve body 1 having a cap 2, an inlet 3, an outlet 4, a cylinder 5, a valve seat 6, having a sharp seating edge 7, adapted to seat against flexible material surrounding piston 8, which is preferably of rubber molded around a metal core having a special shape and includes flared or beaded extremities confined in their entirety to and surrounding the two ends of said piston 8.

Figure 3:
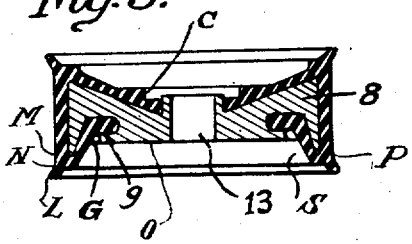
Fig. 3 is a detailed cross-sectional view of piston valve member.
Figure 2:
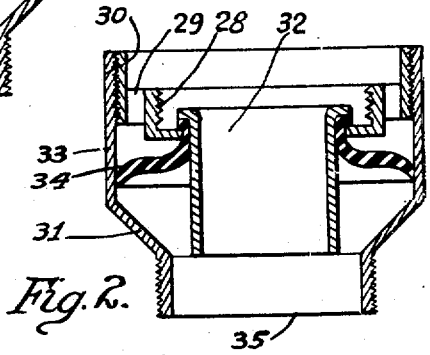
Fig. 2 is a detailed drawing of a non-syphonic unit adapter nut and flexible expansion member for attachment to flush valve units.

The exposed metal shoulder 9 of the piston 8 is adapted to rest against tapered shoulder 10 of the valve seat 6 to limit the inbedment of sharp seating edge 7. It will be noted that the above mentioned flared extremities of the piston are shown in Fig. 3. When the piston of Fig. 3 is inserted in a cylinder the flared extremities L are compressed within the cylinder of the valve to insure a snug fit around the ends of the piston 8.

Referring again to Figure 3 of the drawing, the shape of the narrow beaded piston illustrated there is vital to the proper continuous operation of the valve. The flare L around the bottom and the flared beaded extremity around the top of the piston 8 form a channel space around the entire wall of the piston 8 between the flared extremities and a clearance space P is formed between the points designated by M, N if the piston is inserted into a cylinder. The flared portion S is extended forwardly beyond the face of O at one end of the piston, is not backed up by the relatively hard and solid body portion of the piston 8 the wall of which is backed by the core O, which provides a solid backing to create the relatively solid body portion in conjunction with the material moulded around said core O. When the piston 8 is inserted into the cylinder as of Fig. 1, it is impossible for the external wall of the piston 8 next to the flared extension portion S, L, to take the contour of the cylinder 5 because the material of the flared portion is stretched immediately next to the beaded ends and forced radially inward due to the apex L of the flare S being compressed by the wall of the cylinder 5, there being no solid body disposed inward of the flared portion S to resist the compressing effect of flare L within the cylinder 5. Thus, a pronounced clearance space P is formed immediately next to the flare L between the piston and cylinder walls.

Diametrically enlarged beaded lip portions are provided around the peripheral extremities at both ends of piston 8. These lip portions are compressed into the cylinder 5, tending to flex the wall of the piston 8 away from the wall of said cylinder 5 between the two diametrically enlarged lip portions of piston 8, so that the friction between the wall of piston 8 and the wall of cylinder 5 is diminished and the friction at the beaded extremities of said piston 8 is increased to seal said piston 8 against the by-passing of liquid between the wall of said piston and the wall of said cylinder 5.

Relief valve 11 has a sharp knife-edge relief valve seat portion 12 which is adapted to impinge and cut a seat into the flexible face C of the relief valve recess in piston 8. Said recess has a flat surface surrounding the metal lined relief valve opening 13. A lift pin member 14 is provided and inserted transversely through the lower end of relief valve 11, which is attached by connecting link 15 to handle stem 16, which is inserted through a handle 17 and held in assembly by means of adjusting nut 18 and lock spring 19, the handle assembly being held in alignment by handle cowl 20, which has an inturned rim to limit the tipping of handle 17 and is mounted on cap 2, the threaded extension 21 of cap 2 forming a fulcrum shoulder on which handle flange H normally rests. Flexible packing sleeve and cushion 22 surrounds relief valve guide 23 and stem of relief valve member 11. The flexible packing sleeve and cushion 22 has an enlarged passage at the point where relief valve member 11 enters valve guide 23. It will be noted that the valve cap 2 and the parts assembled in a unit therewith are removable from the valve as a unit, adding greatly to the accessibility of the valve.

Through the upper side of the inlet passage near the inlet 3 is a threadedly inserted by-pass packing nut 24, holding in place the by-pass packing 25 surrounding by-pass adjusting plug 26, which is above by-pass adjusting pin 27, extending through a by-pass opening into the passage from inlet 3 and capable of acting as a check valve. Surrounding the internal circumference of inlet 3 is a clearance groove D to allow free flow of fluid and a full waterway.

Surrounding the outlet opening 4 is an adapter nut 28 integral with a suspension spider having circumferential air inlet openings or ports 29 and an outer rim threadedly inserted into the air inlet tube 33. The integral nut and spider 28 is attached to circumferential tube 33, which tapers to a restriction waist 31 into which is extended reduced outlet insert 32 around which is an air passage defined by arrows A and B, arrow A shows the direction of the air flow when the outlet 32 is subject to vacuum exerted thru the valve body 1 and inlet 3. Arrow B shows the direction in which the air may be drawn by the friction and velocity of the water passing downwardly through the outlet 32. The assembly described in this paragraph comprises the anti-syphonic unit 35.

The operation of my invention is as follows:

To open the valve the handle 17 is provided with oscillatory connections and may be moved laterally in any direction radial to the axis formed by stem 16, the fulcrum formed by the circumferential rim H of handle 17 resting on threaded extension 21 acting as a fulcrum base for lever formed by handle 17. The longitudinal pull exerted through the medium of handle stem 16 held in place by adjusting nut 18 located in recess at the top of handle 17, lock spring 19 serving to prevent nut 18 from turning, exerts a pull upon the universal connection formed by link 15 which is adapted to allow movement of handle 17 longitudinally, circumferentially and pivotally; recesses being provided in lower end of handle 17 and the top of cap 2 to house the link 15. Link 15 is pivotally connected to the upper end and stem of relief valve 11, which extends through cap 2 and the port in center of piston 8. The lift pin 14 serving as mechanical means to lift flexible piston 8 from valve seat 6 when handle 17 is manipulated. The flexible packing sleeve and cushion 22 serve as means to exert a tension to close the valve mechanically by automatic expansion of said packing sleeve 22 after said sleeve 22 has been manually compressed by the manipulation of handle 17. This is of material benefit in case of low water pressure.

When the handle 17 is oscillated in any lateral direction the valve is opened. The handle connecting link 15 providing a universal joint allows for universal lateral movement. When the handle is released closure of the valve is automatically accomplished by the flow of fluid through by-pass passage J into cylinder 5 above piston 8. An automatic mechanical closure is also accomplished through the medium of packing sleeve 22, which is made of resilient compressible flexible material exerting a constant tension against relief valve seat 12, the sharp edge of which is imbedded in the bottom of relief valve recess C in piston 8, thus causing the final closure of the valve. The valve may be closed manually by sustained pressure against the end of handle 17 directly toward the relief valve member 11 and piston 8.

Adjusting nut 18 provides means to adjust the distance between top of handle 17 and the piston 8 and valve seat 6 by limiting the lift of piston 8 when the valve is opened.

It will be noted that the lifting pin 14 is drawn against the lower side of the piston 8 during the oscillatory operation of handle 17 exerting a positive manual stress against piston 8 to open the valve.

The sharp seat of relief valve 12 is a self cleaning feature as any foreign particles are forced to one side or the other of the sharp seat 12, which is imbedded into the bottom of recess C of flexible piston 8, and this imbedment is limited by the metal shoulder formed around relief valve opening 13. The sharp edge 7 of valve seat 6 operates in the same manner as the sharp edge of relief valve 12, the metal shoulder 9 of insert O limiting the depth of embedment. When the relief valve member 11 is raised in recess C the pressure above piston 8 is relieved faster than it can be built up through the medium of by-pass passage J, thus assisting in the opening of the valve by the volume and pressure of fluid entering through inlet 3 and exerted against the piston surface exposed to pressure surrounding the valve seat 6. When the valve is closed the sharp edge 7 is embedded in the flexible piston 8 insuring a leak proof closure.

It has been found that the flexible packing sleeve 22, due to its compressed state tends to force piston 8 to its seat and will exert sufficient expansive force to cause sufficient water to by-pass around the piston when the by-pass is closed, so that the valve will eventually close by the force thus exerted. When the valve is operating on gravity flow of water the valve is opened manually and mechanically and is closed mechanically by the expansion of the packing sleeve 22 acting against the piston in such a manner as to draw fluid through the by-pass J when the by-pass is open.

By-pass pin 27 is moved up and down constantly by the flow of water when the valve is operating, thus tending to keep the by-pass passage surrounding the pin 27 clear of any deposit.

Flexible packing sleeve 22 also acts as a check valve to allow air to enter the chamber formed between the cap 2 and the piston 8 within cylinder 5 to prevent the piston 8 from being lifted from its seat by any vacuum created in a reverse direction through inlet 3, as would happen in case the water were drained off through the main supplying water, as in case of a flush valve. The packing sleeve 22 also acts to prevent fluid from leaking out around the stem of relief valve 11 through guide 23. Air can enter through relief valve guide 23 around relief valve member 11 but fluid cannot be expelled by pressure. It will be noted that a vacuum may draw the flexible packing sleeve 22 away from the stem of relief valve member 11 and guide 23 to allow atmospheric pressure to enter the pressure chamber of cylinder 5. On the other hand, pressure exerted around the outer wall of packing sleeve 22 causes it to be tightly compressed around relief valve member 11 and guide 23.

If any flush valve not provided with anti-siphon features is held open during the time when the water main is drained of water the contents of the bowl may be drawn into the water main and cause contamination thereof. Any type of flush valve is in reality a pressure, mechanically or automatically operated check valve. Therefore, if the valve is opened at the time that the water is being drained from the supply line, or water main, it is necessary to break any siphonic effect by the introduction of air between the water level in the bowl and the valve. The anti-syphonic unit 35 as hereinafter described, has been devised to take care of such conditions, and may be built integral with the valve or in a detachable combination as illustrated.

The operation of the antisyphonic unit is as follows:

When the valve is installed in an upright position, and is open at a time when a suction is created in a reverse direction through inlet 3, air passes in the direction shown by line and arrow A, but when water is running through the valve in a normal direction, as indicated by arrow M, then air is drawn through the external inlet tube 33 surrounding adapter nut 28, thence through restriction waist 31, surrounding the reduced outlet extension 32, which is extended preferably slightly above or it may be extended below the narrowest point indicated as restriction waist 31.

When a flow of water is backed up by the resistance set up within the connections between the toilet bowl and the valve or for any reason rises into the non-syphonic unit 32, the annular, flexible member 34 acts as a positive check valve being forced across the circumferential air inlet 29 by internal pressure the peripheral edge being forced radially outward and upward against the inner circumference of tube 33.

It has been discovered that if the valve is installed in a horizontal position water tends to leak back through the air passage 29. To prevent this leakage the flexible expansion member 34 has been provided. The member 34 is held in position between the reduced outlet insert 32 and adapter nut 28.

The annular flexible expansion member 34 is preferably molded of very soft rubber or may be made of fabric, leather or other flexible material suitable to offer as little resistance as possible to the passage of air and is bell shaped in form. The air passing through the anti-siphon unit in the direction indicated by line and arrow A is not interfered with by member 34 but, when water is forced upward by back pressure, flexible member 34 is expanded tightly against the wall of external air inlet tube 33, thus preventing water from being forced in reverse direction and spilling out through air passage 29. Thus it will be seen that air can be freely admitted through antisyphonic unit 35 but water cannot be expelled through the passage admitting air. The movement of fluid through the outlet of the flush valve unit will therefore be seen to expand or contract flexible member 34 as the case may be.

Coincident with the purposes of my invention set forth, the objects of my invention are attained as follows:

The handle 17 provides manual opening means combined with pressure closing means as described.

Mechanical closure is accomplished by the expansion of flexible packing sleeve 22, while a pressure exerted on the end of handle 17 causes a manual closure of the valve.

The sharp edges of valve seats provide self cleaning and positive valve seats.

The tapered rim of the piston concentric to the valve seat 6 causes a tapered off closure by gradual approach of the concentric tapered portion of piston 8 toward valve seat 6.

The timing may be adjusted for the flow of more water or fluid through the valve by limiting the opening movement of piston 8 through the adjustment of adjusting nut 18 and handle 17 by allowing a greater movement of handle before valve starts to open.

A syphonic action when the valve is open is diminished by the provision of an air inlet 29 concentric to the valve outlet.

Additional anti-syphonic provision is made for the valve when in closed position by the provision of an air by-pass formed by the clearance around the stem of relief valve 11, through relief valve guide 23, to allow the ingress of air into pressure chamber formed in cylinder 5 above piston 8, in case a vacuum is formed by syphonic action.

Flexible packing sleeve and cushion 22 will allow air to enter the pressure side of the valve and provides means to prevent fluid from being forced outward through guide 23.

Having described my invention, the purposes thereof, its operation and provisions for meeting the purposes set forth, I claim:

1. A combination manual non-siphonic valve comprising a body having an inlet and outlet, a valve member disposed across a valve seat between said inlet and outlet and having attached thereto a valve stem extending through said body, and including manual operating means attached to said stem, a flange extending radially outward and forming an annular spider comprising an air inlet element surrounding the outlet of said valve, an air inlet tube depending from the periphery of said spider, a centrally disposed tubular extension formed beyond the outlet of said valve and being concentric to said air inlet tube, said tubular extension supporting an annular check valve member adapted to close said air inlet element when pressure is exerted within said air inlet tube, and to allow the ingress of atmospheric pressure when said valve is subjected to vacuum during the period when the valve is held open by said manual operating means.

2. For use with a combination manual non-siphonic valve, a non-siphonic unit comprising a circumferential air inlet surrounded by an external air inlet tube, including means to allow air to enter around the outlet end of said valve, and positive check valve means to prevent the egress of water through said circumferential inlet.

3. In an anti-siphonic valve unit, a combination comprising a body having an inlet and outlet, a handle located in continuous alignment with a handle stem extending through a valve cap provided for said body, an adjusting nut on said handle stem, a connecting link between said handle stem and a relief valve member extending through a guide in said cap, a retaining cowl disposed on the upper side of said cap around a flange at the lower end of said handle, said cap threadedly mounted in alignment with a cylinder disposed in said body between said inlet and outlet, a piston in said cylinder, said relief valve member extending through said piston, a sharp valve seat around the seating edge of said relief valve member adapted to be forced against said piston by an end thrust against said handle, said relief valve adapted for limited embedment in the material of said piston by a metal rim extending around the inside of a relief valve port in said piston, an element on the end of said relief valve member located on the opposite side of said piston, said element adapted to contact the outer end of said relief valve port to pull said piston toward said cap when said handle is oscillated laterally, a valve seat around said outlet extended into said cylinder, and a recess in the end of said piston, said inlet entering said cylinder at one end of said piston forming one side of a pressure chamber in said cylinder, a self cleaning by-pass assembly disposed in a passage between said inlet and said pressure chamber and comprising a loose pin having a head thereon adapted to act as a check valve member to close the said by-pass passage, the outlet from said valve having an anti-siphonic unit appended thereto comprising a flanged attaching nut having a radially extended air inlet portion attached to an air inlet tube disposed in concentric relationship to said attaching nut, a check valve member disposed across said air inlet portion between the outlet of said valve and said air inlet tube, said anti-siphonic unit providing means to break a vacuum between the anti-siphonic valve unit and connections therebeyond.

4. A valve of the nature described, comprising a body having an inlet and outlet, an expansion chamber in said body, a movable valve member at one side of said expansion chamber, a by-pass communicating with said expansion chamber from the inlet side of said valve, a valve seat between said inlet and outlet, a port communicating with said expansion chamber through said valve member, a relief valve member to close said port in said valve member, said relief valve member having a stem extending through one side of said valve body, a flexible sleeve surrounding the stem of said relief valve, said flexible sleeve forming a packing compressible by fluid pressure against the stem of said relief valve and guide to prevent the egress of fluid from said valve, said flexible sleeve adapted to be retracted by vacuum to allow ingress of air under atmospheric pressure into said expansion chamber, a lever attached to said relief valve stem, said lever adapted to be moved laterally to open said valve and to be pushed endwise to close said valve.

5. A flush valve unit as of claim 4 in which the stem extended through one side of said body is disposed through a guide opening in a valve cap forming an air inlet passage around said stem, said cap closing one end of the expansion chamber of said valve, the flexible sleeve surrounding said guide and opening and the stem of the relief valve and being compressed between the seating portion of said relief valve and the inside of said valve cap subject to being retracted from around said guide when the expansion chamber formed between the piston of said valve and the valve cap is subjected to vacuum, said flexible sleeve being compressed about the stem of said relief valve and against said guide to prevent the egress of fluid pressure when exerted within said expansion chamber.

6. In combination, a valve comprising a body, an inlet port and an outlet port in said body, a pressure chamber between said inlet and said outlet port in said body, a by-pass passage communicating with said inlet port and said pressure chamber, a piston disposed in said pressure chamber, a relief valve member extending through a port in said piston, said relief valve member loosely attached through said port in said piston, said relief valve extending through said pressure chamber and the wall of said pressure chamber, said relief valve having an enlarged seat portion adapted to seat across said port in said piston, an elastic member disposed around the stem portion of said relief valve extending through said pressure chamber and the wall of said pressure chamber, said elastic member extending across an opening and a relief valve guide in the wall of said pressure chamber, a link attachment connected to said relief valve stem extending through the wall of said pressure chamber, said link attachment attached to a handle, said handle adapted to be moved laterally in any direction to open said valve, said valve adapted to be closed by manual pressure against the end of said handle.

7. A piston for flush valves comprising a re-enforcing core of relatively hard material and an outer portion of relatively flexible material, said piston having a substantially cylindrical peripheral wall terminating in outwardly flared lips, said lip portions in the entirety, and also those parts of said peripheral wall closely adjacent thereto, being beyond the ends of said core, whereby when the piston is inserted in a cylinder of a diameter substantially equal to the diameter of the main body portion of the piston the lips are forced inwardly by the wall of said cylinder and said portions of the peripheral wall of the piston closely adjacent to said lips, being unsupported by the reenforcing core, are also forced inwardly, resulting in a clearance space between the piston and cylinder walls closely adjacent to said lips.

8. A piston having a relatively solid cylindrical body portion and having faces at the ends of said body portion, an outwardly flared lip at an end of said body portion, the outward projection of said lip being of sufficient extent and being sufficiently abrupt that when the piston is inserted in a cylinder of a diameter substantially equal to the diameter of said body portion the flared lip is forced inwardly beyond the end of the body portion and that portion of the cylindrical body wall immediately adjacent the lip is also carried inwardly beyond the end of the body portion thereby forming a clearance space between the piston and cylinder walls adjacent to said flared lip.

9. A piston mounted in a cylinder, said piston comprising a cylindrical body portion of rubber or the like moulded about a harder core, means forcing the material of the body portion adjacent the ends thereof radially inward to form annular spaces or grooves between the cylinder and the cylindrical body portion of the piston, said means comprising abruptly flared lips or beads at the marginal edges of said cylindrical body portion.

10. For use with a valve of the nature described, an anti-syphonic attachment comprising a leakproof flexible, bell-like member, held in position surrounding a reduced outlet insert, said leakproof, flexible member being disposed between a valve outlet and a circumferential air inlet tube surrounding the outlet of said valve, said flexible member being composed of rubberlike material adapted to be compressed away from the wall of said circumferential air inlet tube when the outlet passage of said valve is subjected to a vacuum; said leakproof, flexible bell-shaped member adapted to be forced against the internal wall of the circumferential tube surrounding the outlet portion of said valve when fluid pressure is exerted within the passage formed by the outlet passage of said valve in conjunction with the described non-syphonic attachment.

11. For use with a valve of the class disclosed by the descriptive matter hereof, a non-syphonic unit comprising an external air inlet tube disposed concentrically to an outlet tube portion of said valve, a space between said outlet tube portion of said valve and said external, concentrically disposed inlet tube, a bell-shaped, flexible member disposed across said space between said outlet portion of said valve and said external, concentrically disposed air inlet tube, said bell-shaped, flexible member adapted to be collapsed by the ingress of air pressure through said space between said outlet tube portion of said valve and said external, concentrically disposed air inlet tube; said bell-shaped, flexible member adapted to be expanded by internal water pressure across said space between said outlet portion of said valve and said external, concentrically disposed air inlet tube.

12. For use with a valve of the class described, a non-syphonic device, comprising an expansible and collapsible member disposed within an air inlet consisting of an annular space between an external, concentrically disposed air inlet tube surrounding the outlet portion of a valve of the class described, said expansible and collapsible member subject to expansion by internal pressure to close said annular space and said air inlet tube, said expansible and collapsible member capable of collapse by external pressure to open said annular space comprising said air inlet tube.

13. For connection to a valve of the kind described having an inlet and outlet, a non-syphonic unit having elements for attachment to a valve and forming a cap and air inlet comprising a perforated top portion circumscribed by an annular tube, a check valve closure element seating across said air inlet disposed between the valve outlet and said annular tube to close said air inlet to the egress of fluid from within said tube outwardly thru said air inlet.

14. For connection to the outlet of a valve of the kind described, a non-syphonic unit comprising an attaching nut having a spider extending circumferentially therearound and constituting an air inlet element between said nut and an external air inlet tube surrounding and depending from the nut and spider, an annular check valve member disposed inside said air inlet tube to seat across said air inlet and being cooperable with fluid pressure therebelow exceeding atmospheric pressure to prevent the egress of fluid through said air inlet element whereby air is allowed to enter said air inlet tube to break any vacuum created therein.

15. An anti-siphon valve unit comprising an air inlet tube surrounding a second tube forming a valve outlet extension, the upper side of both tubes being attached together at the top by means of an annular flange having air inlet ports extending therethrough and adapted to be attached to the outlet of a valve of the nature described, said second named tube projecting for a distance into the first named tube, the ported annular flange adapted to admit air under atmospheric pressure in a direction parallel with and between both of the described tubes and around the end of and radially into said second named tube when vacuum is exerted therein, said second named tube clearing said first named tube at all points sufficiently to provide a free passageway for air around the end of and into the second named tube, said tubes being positioned so that fluid passing outwardly from said second-named tube will draw air through said air ports, the area of the passageway between the end of the second named tube and the inside of the first named tube being equivalent to at least the area of the opening through the second named tube.

JESSE D. LANGDON.